United States Patent
Wagner et al.

(10) Patent No.: US 12,365,447 B2
(45) Date of Patent: Jul. 22, 2025

(54) CONTROL SURFACE ACTUATOR ASSEMBLY WITH GUST LOCK

(71) Applicant: HONEYWELL INTERNATIONAL INC., Charlotte, NC (US)

(72) Inventors: Joseph Wagner, Tempe, AZ (US); Zachary Brown, Tempe, AZ (US); Darrell Horner, Tempe, AZ (US); Kevin Gardner, Tempe, AZ (US); Ronald Vaughan, Tempe, AZ (US)

(73) Assignee: HONEYWELL INTERNATIONAL, INC., Charlotte, NC (US)

( * ) Notice: Subject to any disclaimer, the term of this patent is extended or adjusted under 35 U.S.C. 154(b) by 143 days.

(21) Appl. No.: 18/298,550

(22) Filed: Apr. 11, 2023

(65) Prior Publication Data
US 2024/0124130 A1 Apr. 18, 2024

Related U.S. Application Data

(60) Provisional application No. 63/379,478, filed on Oct. 14, 2022.

(51) Int. Cl.
*B64C 13/38* (2006.01)
(52) U.S. Cl.
CPC .................................. *B64C 13/38* (2013.01)
(58) Field of Classification Search
CPC ............. B64C 13/38; F16H 2025/2075; F16H 25/2454
See application file for complete search history.

(56) References Cited

U.S. PATENT DOCUMENTS

| | | |
|---|---|---|
| 2003/0159429 A1 | 8/2003 | Langston et al. |
| 2005/0051671 A1 | 3/2005 | Djuric |
| 2019/0154149 A1* | 5/2019 | Gruber .................... B60K 1/00 |
| 2022/0185448 A1* | 6/2022 | Rozeboom ............... B64C 5/16 |

FOREIGN PATENT DOCUMENTS

| | | |
|---|---|---|
| EP | 1721825 A1 | 11/2006 |
| EP | 3056400 A1 | 8/2016 |
| WO | 2018001476 A1 | 1/2018 |

* cited by examiner

*Primary Examiner* — Timothy D Collins
*Assistant Examiner* — Eric Acosta
(74) *Attorney, Agent, or Firm* — Lorenz & Kopf LLP

(57) ABSTRACT

An actuator assembly includes an actuator drive source and a gust lock. The actuator drive source is operable to supply an actuator drive torque to drive a component. The gust lock is movable between a locked position, in which rotation of the drive source is prevented, and an unlocked position, in which rotation of the drive source is not prevented. The gust lock includes a lock shaft, a lock rotor, a lock motor, and a linear actuator. The lock shaft is rotatable with the drive source when the gust lock is in the unlocked position. The lock rotor is rotatable with the lock shaft. The lock motor is configured to supply a lock drive torque. The linear actuator is coupled to receive the lock drive torque and is configured, upon receipt of the lock drive torque, to move between an engaged position and a disengaged position.

15 Claims, 5 Drawing Sheets

CONTROL SURFACE ACTUATOR ASSEMBLY WITH GUST LOCK

CROSS-REFERENCE TO RELATED APPLICATIONS

The present application claims benefit of prior filed U.S. Provisional Patent Application No. 63/379,478, filed Oct. 14, 2022, which is hereby incorporated by reference herein in its entirety.

TECHNICAL FIELD

The present disclosure generally relates to actuator assemblies, and more particularly relates to a control surface actuator assembly that includes a gust lock.

BACKGROUND

Actuators are used in myriad devices and systems. For example, many vehicles such as, for example, aircraft, including urban air mobility (UAM)/light aircraft, spacecraft, watercraft, and numerous other terrestrial and non-terrestrial vehicles, include one or more actuators to move various control surfaces or components. In the emerging UAM/light aircraft market, the aircraft are electrically operated and, when on the ground and unpowered, can be susceptible to gust loads on the control surfaces. Thus, there is a need to provide a means for locking the control surfaces against these gust loads.

There are various challenges associated with implementing a gust lock in the UAM/light aircraft market. For example, the lock should preferably be automated, as opposed to manual. As such, the lock needs to be electrically operated, but not continuously draw current from the aircraft batteries. The lock also needs to be lightweight and relatively small. It should also preferably be a relatively low-cost solution. The present disclosure addresses at least these needs.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, an actuator assembly includes an actuator drive source and a gust lock. The actuator drive source is operable to rotate and supply an actuator drive torque to drive a component. The gust lock is movable between a locked position, in which rotation of the drive source is prevented, and an unlocked position, in which rotation of the drive source is not prevented. The gust lock includes a lock shaft, a lock rotor, a lock motor, and a linear actuator. The lock shaft is coupled to, and is rotatable with, the drive source when the drive source is rotating, and the gust lock is in the unlocked position. The lock rotor is disposed on, and is rotatable with, the lock shaft. The lock motor is configured, upon being electrically energized, to supply a lock drive torque. The linear actuator is coupled to receive the lock drive torque and is configured, upon receipt of the lock drive torque, to move between an engaged position, in which it engages the lock rotor and prevents the lock shaft and drive source from being rotated, and a disengaged position, in which it does not engage the lock rotor and does not prevent the lock shaft and drive source from being rotated.

In another embodiment, a control surface actuator assembly includes an actuator housing, an actuator drive source, a drive shaft, and a gust lock. The actuator drive source is disposed within the actuator housing and is operable to rotate and supply an actuator drive torque. The drive shaft is rotationally mounted within, and extends from, the actuator housing. The drive shaft is coupled to receive the drive torque from the actuator drive source to thereby position a control surface. The gust lock is disposed within the actuator housing and is movable between a locked position, in which rotation of the drive source is prevented, and an unlocked position, in which rotation of the drive source is not prevented. The gust lock includes a lock shaft, a lock rotor, a lock motor, a lock drive screw, and a lock drive nut. The lock shaft is coupled to, and is rotatable with, the drive source when the drive source is rotating, and the gust lock is in the unlocked position. The lock rotor is mounted on, and is rotatable with, the lock shaft. The lock motor is configured, upon being electrically energized, to supply a lock drive torque. The lock drive screw is coupled to receive the lock drive torque and is configured, upon receipt of the lock drive torque, to rotate. The lock drive nut is mounted on the lock drive screw and is configured to translate, when the lock drive screw rotates, between an engage position, in which it engages the lock rotor and prevents the lock shaft and drive source from being rotated, and a disengage position, in which it does not engage the lock rotor and does not prevent the lock shaft and drive source from being rotated. The gust lock is in the locked position and the unlocked position when the lock drive nut is in the engage position and the disengage position, respectively.

In yet another embodiment, a system for controlling an aircraft flight control surface includes a controller and a flight control surface actuator. The controller is configured to control movement of the aircraft flight control surface. The flight control surface actuator is in operable communication with the controller and includes an actuator housing, an actuator drive source, a drive shaft, and a gust lock. The actuator drive source is disposed within the actuator housing and is configured to be selectively energized from the controller and is operable, upon being energized, to rotate and supply an actuator drive torque. The drive shaft is rotationally mounted within, and extends from, the actuator housing. The drive shaft is coupled to receive the drive torque from the actuator drive source to thereby position the aircraft flight control surface. The gust lock is disposed within the actuator housing and is configured, in response to commands from the controller, to move between a locked position, in which rotation of the drive source is prevented, and an unlocked position, in which rotation of the drive source is not prevented. The gust lock includes a lock shaft, a lock rotor, a lock motor, and a linear actuator. The lock shaft is coupled to, and is rotatable with, the drive source when the drive source is rotating, and the gust lock is in the unlocked position. The lock rotor is disposed on, and is rotatable with, the lock shaft. The lock motor is configured, upon being electrically energized, to supply a lock drive torque. The linear actuator is coupled to receive the lock drive torque and is configured, upon receipt of the lock drive torque, to move between an engaged position, in which it engages the lock rotor and prevents the lock shaft and drive source from being rotated, and a disengaged position, in which it does not engage the lock rotor and does not prevent the lock shaft and drive source from being rotated.

Furthermore, other desirable features and characteristics of the control surface actuator assembly will become apparent from the subsequent detailed description and the appended claims, taken in conjunction with the accompanying drawings and the preceding background.

BRIEF DESCRIPTION OF DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
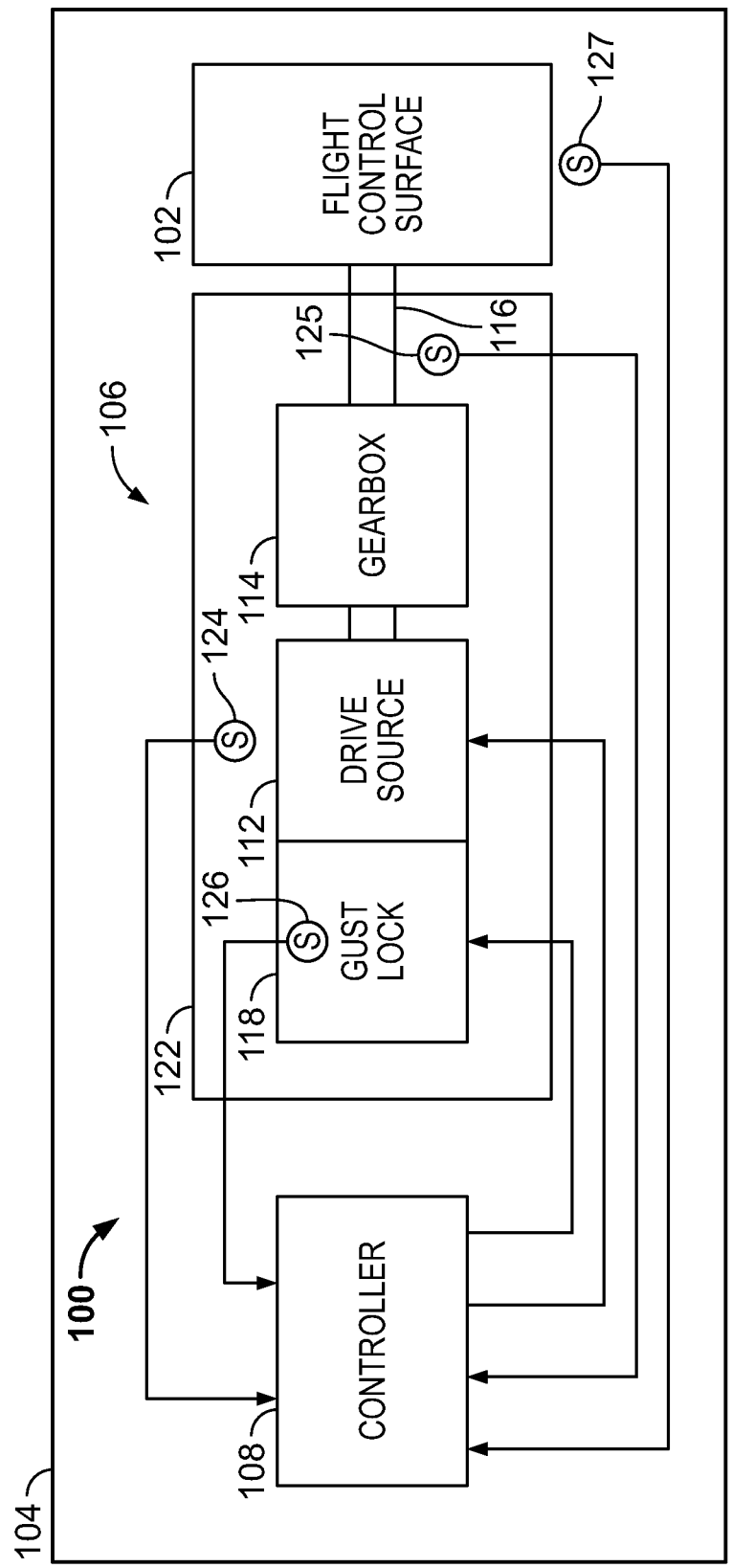
FIG. 1 depicts a simplified functional block diagram of a system for controlling a single flight control surface on a UAM aircraft.

Referring to FIG. 1, a simplified functional block diagram of a system 100 for controlling a single flight control surface 102 on a UAM aircraft 104. Before proceeding further, it should be noted that the UAM aircraft 104 (or other light aircraft) may, and likely would, include more than one flight control surface 102. However, for ease of description and illustration, only the single flight control surface 102 is depicted. Moreover, the invention described herein is not limited to use with a flight control surface.

Continuing now with the description, it is seen that the system 100 includes an actuator assembly 106 and a controller 108. The actuator assembly 106 includes at least a drive source 112, a gearbox 114, an output shaft 116, and a gust lock 118, all of which are at least partially disposed within a housing 122. The drive source 112 is preferably an electric motor having a motor output shaft 113 that is coupled to the gearbox 114. Thus, when the drive source 112 is electrically energized, it supplies a drive torque, via the motor output shaft 113, to the gearbox 114. It will be appreciated that the gearbox 114 may be variously configured and implemented to provide the desired torque-speed characteristic for the actuator assembly 106. In one particular embodiment, however, it is implemented using a planetary gearbox.

No matter how the gearbox 114 is specifically implemented, it is also coupled to the output shaft 116. Thus, it transfers the torque supplied by the drive source 112 to the output shaft 116. The output shaft 116 extends from the housing 122 and is coupled to the flight control surface 102. Thus, rotation of the output shaft 116 causes movement of the flight control surface 102.

The gust lock 118, embodiments of which are described in more detail further below, is moveable between a locked position and an unlocked position. In the locked position, the gust lock 118 prevents rotation of the drive source 112, and thus the flight control surface 102. In the unlocked position, the gust lock 118 does not prevent rotation of the drive source 112, and thus does not prevent movement of the flight control surface 102. The gust lock 118 is preferably configured to move between the locked and unlocked positions only when energized, and to remain in the last commanded position (either lock or unlock), when not energized. In other embodiments, however, the gust lock 118 could be configured to move to a default position (either lock or unlock), upon removal of power.

The controller 108 is in operable communication with the drive source 112 and the gust lock 118. Although the controller 108, at least in the depicted embodiment, is shown as being disposed separate from the actuator assembly 106, in some embodiments the controller 108 may be disposed within the actuator assembly housing 122. Regardless of its specific location, the controller 108 is configured to selectively energize the drive source 112, to thereby control the movement of the flight control surface 102. The controller 108 is also configured to control movement of the gust lock 118 between its locked and unlocked positions. The controller 108 may implement these functions using any one of numerous known control techniques. To facilitate these functions, and as FIG. 1 further depicts, the system 100 may additionally include one or more sensors. More specifically, it may include a drive source position sensor 124, an actuator output sensor 125, one or more gust lock position sensors 126, and, at least in some embodiments, a control surface position sensor 127. The drive source position sensor 124 may sense drive source 112 position by, for example, sensing the rotational position of the drive source 112, and supply drive source position signals representative thereof. The actuator output sensor 125 may sense actuator output position and supply actuator position signals representative thereof. The gust lock position sensor(s) 126 senses when the gust lock 118 is in its locked and unlocked positions and supplies lock position signals representative thereof. The control surface position sensor 127, when included, may sense the position of the flight control surface 102 and supply flight control surface position signals representative thereof. The flight control surface position signals may be supplied to the controller 108 either directly (as depicted) or via a non-illustrated flight control computer.

It will be appreciated that the drive source position sensor 124, the actuator output position sensor 125, the gust lock position sensor(s) 126, and the flight control surface position sensor 127 may each be implemented using any one of numerous known types of position sensors. For example, these sensors 124, 125, 126, 127 may be implemented using any one of numerous suitable linear or rotary position sensors, for example, magnetic sensors (e.g., Hall sensors), optical sensors, capacitive sensors, resistive sensors, inductive sensors, or semiconductor sensors, just to name a few.

Figure 2:
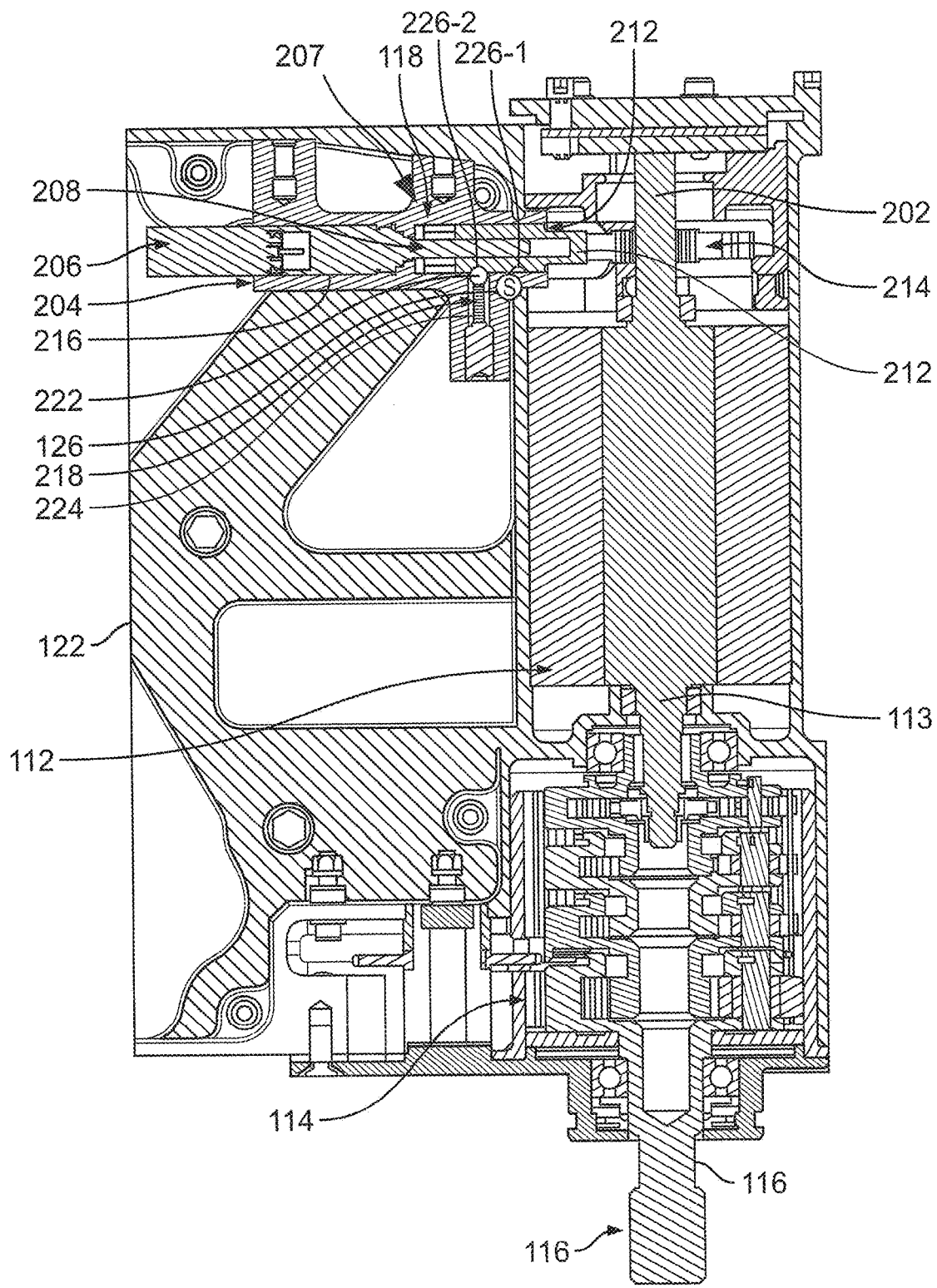
FIG. 2 depicts a cross section view of one embodiment of an actuator assembly that may be used in the system of FIG. 1 and that includes one embodiment of a gust lock.
Figure 3:
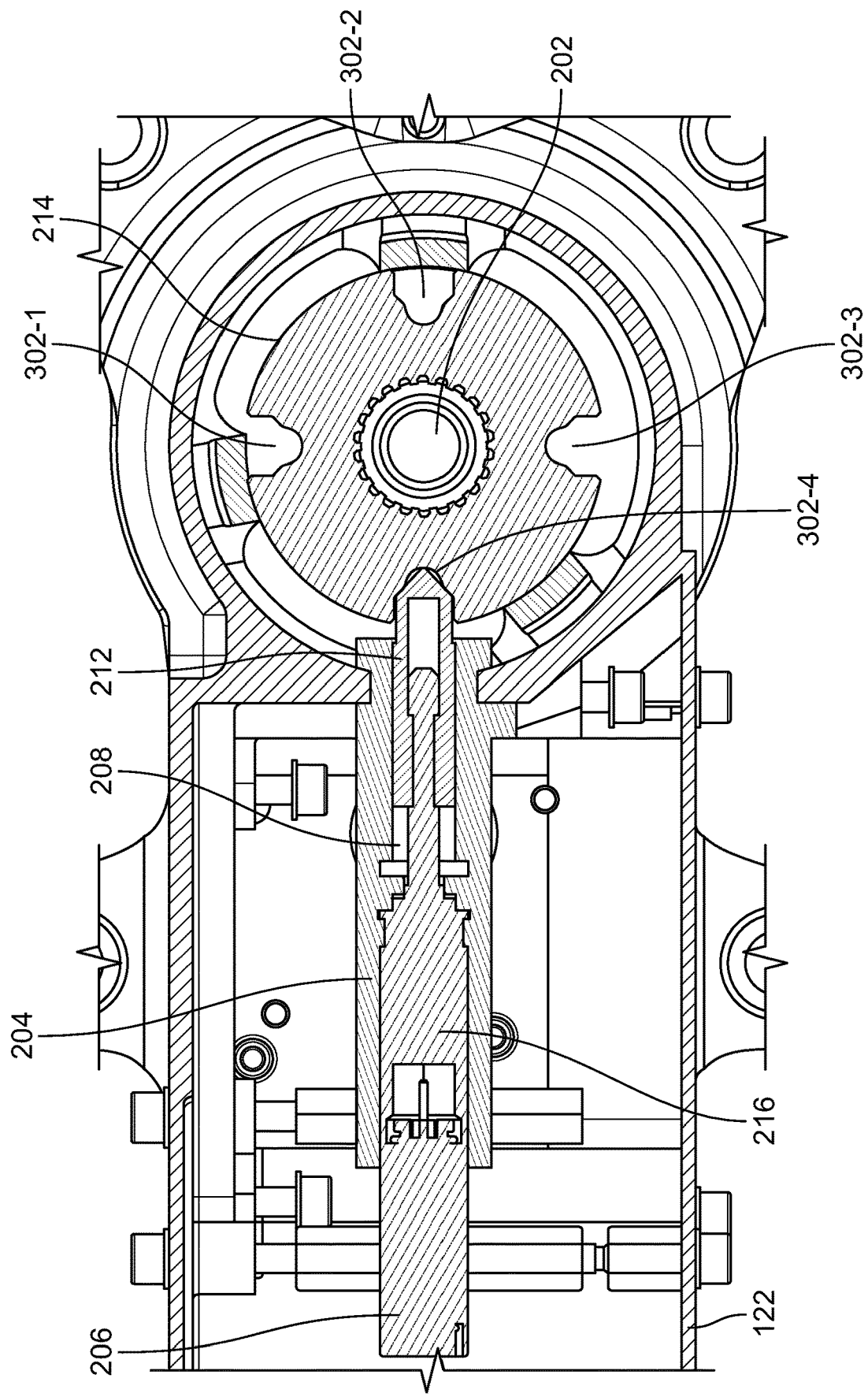
FIG. 3 depicts a cross section view of a portion of the actuator assembly of FIG. 2 that shows the gust lock in more detail.

Referring now to FIGS. 2 and 3, a more detailed description of the gust lock 118 will be provided. These figures also depict embodiments of the drive source 112, gearbox 114, output shaft 116, and housing 122 in more detail. These components are generally conventional in nature and will thus not be further described in more detail. One feature of the depicted drive source 112 that was not previously described is that it additionally includes what is referred to herein as a lock shaft 202, which is also rotated when the drive source 112 is energized to rotate and the gust lock 118 is in the unlocked position.

Turning to the depicted gust lock 118, it includes at least a lock housing 204, a lock motor 206, a linear actuator 207, and a lock rotor 214, all of which are preferably mounted within the actuator housing 122. The lock motor 206 is preferably implemented using a DC motor, though various other types of motors could also be used. The lock motor 206 is configured, when electrically energized, to supply a drive torque. Preferably, the lock motor 206 is electrically energized via the controller 108 (not shown in FIGS. 2-4).

The linear actuator 207 is coupled to receive the lock drive torque supplied from the lock motor 206 and is configured, upon receipt of the lock drive torque, to move between an engaged position and a disengaged position. It will be appreciated that the linear actuator 207 may be implemented using any one of numerous known linear actuators such as, for example, a lead screw actuator, a ball screw actuator, an acme screw actuator, or a roller screw actuator. No matter how it is specifically implemented, the linear actuator 207, at least in the depicted embodiment, includes a lock drive screw 208 and a lock drive nut 212.

The lock drive screw 208 is disposed within the lock housing 204 and is coupled to receive the drive torque supplied by the lock motor 206. The lock drive screw 208 is mounted in the lock housing 204 in a manner that the lock drive screw 208 is prevented from translating but is allowed to rotate. In the depicted embodiment, the drive torque is supplied to the lock drive screw 208 via a gearbox 216, such as a planetary gearbox, that is coupled between the lock motor 206 and lock drive screw 208. In other embodiments, the lock drive screw 208 may be coupled directly to the lock drive motor 206. Regardless of whether or not the gearbox 216 is included, the lock drive screw 208, which has threads formed on its outer surface, is configured, upon receipt of the drive torque, to rotate.

The lock drive nut 212 is disposed at least partially within, and may extend from, the lock housing 204. The lock drive nut 212 is mounted in the lock housing 204 in a manner that the lock drive nut 212 is prevented from rotating but is allowed to translate. The lock drive nut 212 is also mounted on the lock drive screw 208 and has threads formed on its inner surface that engage the threads on the lock drive screw 208. Thus, when the lock drive screw 208 rotates, the lock drive nut 212 translates relative to the lock housing 204 and the lock drive screw 208. As may be appreciated, the direction in which the lock drive nut 212 translates depends on the direction in which the lock drive screw 208, and thus the lock motor 206, rotates. In this manner, the lock drive nut 212 is movable between the locked position and the unlocked position.

The lock rotor 214 is mounted on (or formed integrally with), and is rotatable with, the lock shaft 202. The lock rotor 214 is selectively engaged and disengaged by the lock drive nut 212. More specifically, when lock drive nut 212 is in the unlocked position, it does not engage the lock rotor 214, and the lock rotor 214 and drive source 112 are free to be rotated. Conversely, when the lock drive nut is in the locked position, it engages the lock rotor 214, and the lock rotor 214 and drive source 112 are prevented from being rotated. To facilitate this functionality, and as FIG. 3 shows most clearly, the depicted lock rotor 214 has a plurality of engagement cavities 302 formed therein. When the lock drive nut 212 is moved to the locked position, it is disposed within one of these engagement cavities 302, thereby preventing rotation of the lock rotor 214. In the depicted embodiment, the lock rotor 214 has four engagement cavities 304 (304-1, 304-2, 304-3, 304-4) formed therein. It will be appreciated, however, that the lock rotor may include more or less than this number of engagement cavities 304. It will be appreciated that in other embodiments, the engagement features could be implemented differently. For example, the lock drive nut 212 could include a slot feature and the lock rotor 214 or lock shaft 202 could include a feature, such as a flat, that the slot feature engages when the lock drive nut 212 is in the locked position.

Before proceeding further, it is noted that in some embodiments the lock drive screw 208 and lock drive nut 212 are mounted in the lock housing 204 in a manner that the lock drive screw 208 is prevented from rotating but is allowed to translate, and the lock drive nut 212 is prevented from translating but is allowed to rotate. In such embodiments, the lock drive nut 212 is coupled to receive the drive torque supplied by the lock motor 206, either directly or via the gearbox 216 and is configured, upon receipt of the drive torque, to rotate. The lock drive screw 208, in these embodiments, when the lock drive nut 212 rotates, the lock drive screw 208 translates relative to the lock housing 204 and the lock drive nut 212 and is thereby movable between the locked position, in which it engages the lock rotor 214, and the unlocked position, in which it does not engage the lock rotor 214.

The gust lock 118 in FIGS. 2 and 3 is commanded to move between the locked and unlocked positions only when the lock motor 206 is appropriately energized by, for example, the controller 108 (or a separate power source). In this manner, the gust lock 118 remains in the last commanded position (either lock or unlock). However, as depicted in FIG. 2, the gust lock 118 may also, in some embodiments, include a detent mechanism 218 to provide further protection that the gust lock 118 remains in the last commanded position.

The detent mechanism 218, when included, may be variously configured. In the embodiment depicted in FIG. 2, it includes a detent ball 222, and a spring 224 that urges the detent ball 222 into engagement with the lock drive nut 212. As FIG. 2 also shows, with the depicted detent mechanism 218, two depressions 226—an unlock depression 226-1 and a lock depression 226-2—are formed in the outer surface of lock drive nut 212. The unlock depression 226-1 is located at a position such that the detent ball 222 is disposed within the unlock depression 226-1 when the lock drive nut 212 is in the unlocked position. Similarly, the lock depression 226-2 is located at a position such that the detent ball 222 is disposed within the lock depression 226-2 when the lock drive nut 212 is in the locked position.

Figure 4:
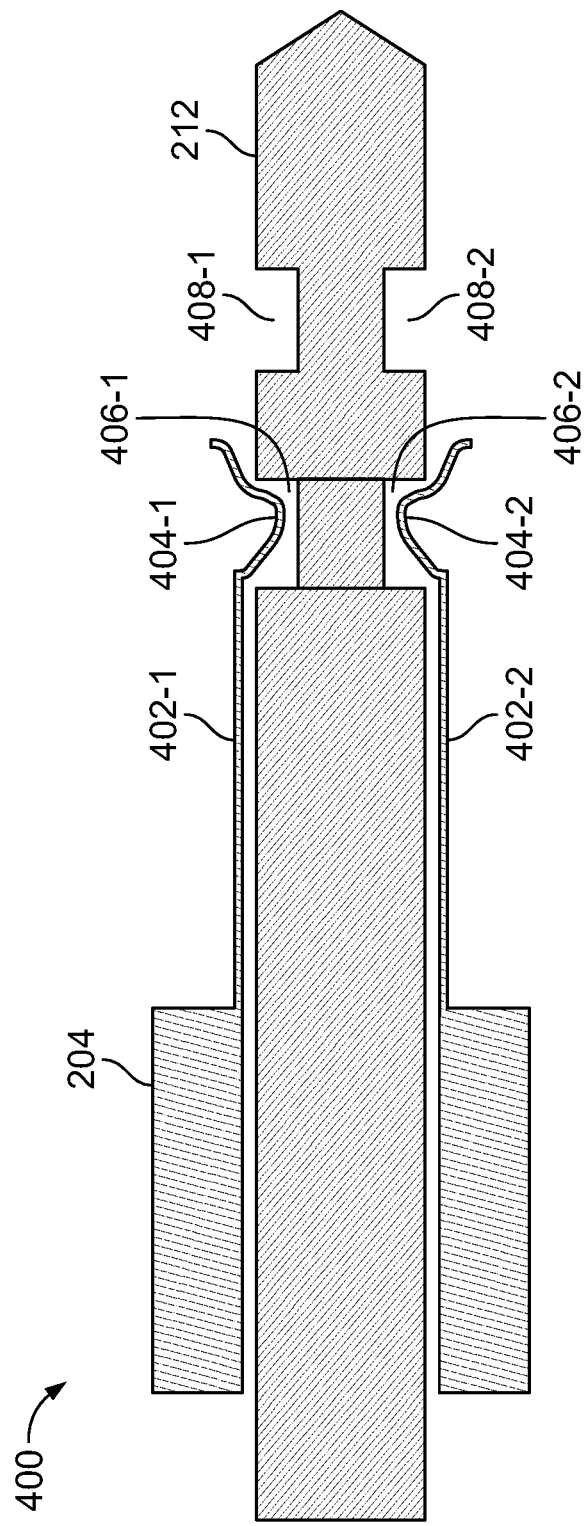
FIG. 4 depicts a simplified cross section view of an alternative embodiment of a detent mechanism.

In another embodiment, which is depicted in FIG. 4, the detent mechanism 400 includes a plurality of detent springs 402 (402-1, 402-1) that are coupled to, and extend from, the lock housing 204 in a cantilevered manner, and each includes an engagement portion 404 (404-1, 404-2). As FIG. 4 also shows, with the depicted detent mechanism 400, a plurality of lock depressions 406 (406-1, 406-2) and a plurality of unlock depressions 408 (408-1, 408-2) are formed in the outer surface of lock drive nut 212. The lock depressions 406 are located at a position such that the engagement portions 404 are disposed within the lock depressions 406 when the lock drive nut 212 is in the locked position. Similarly, the unlock depressions 408 are located at a position such that the engagement portions 404 are disposed within the unlock depressions 408 when the lock drive nut 212 is in the unlocked position.

It was previously noted that the system 100 may additionally include one or more gust lock position sensors 126 (for clarity, only one is depicted). As was also previously noted, the gust lock position sensor(s) 126, when included, may be implemented using any one of numerous known magnetic sensors (e.g., Hall sensors), optical sensors, capacitive sensors, resistive sensors, inductive sensors, or semiconductor sensors, just to name a few. Although the gust lock position sensor 126, when included, may be variously disposed within the lock housing 204, in the depicted embodiment it is disposed within the same space envelope adjacent to, or instead of, the detent mechanism 218.

Figure 5:
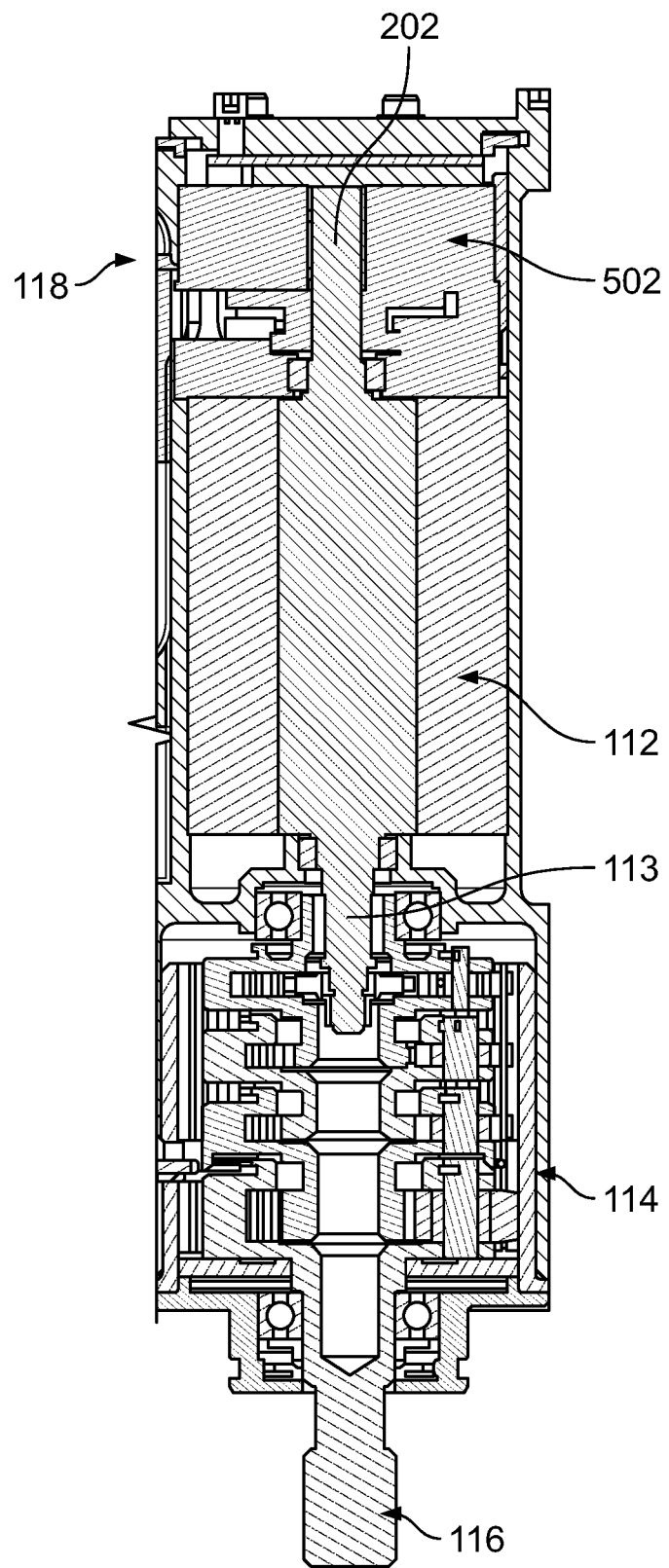
FIG. 5 depicts a cross section view of one embodiment of an actuator assembly that may be used in the system of FIG. 1 and that includes another embodiment of a gust lock.

With quick reference now to FIG. 5, another embodiment of the gust lock 118 is depicted and will now be briefly described. With this embodiment, the gust lock 118 is configured as an electromagnetic brake assembly 502. The electromagnetic brake assembly 502 is mounted in the housing 122 and is coupled to the drive source 112. The electromagnetic brake assembly 502 may be any one of numerous electromagnetic brake designs known in the art that, preferably, applies a braking force to drive source 112 when power is removed from the brake assembly 502, and removes the braking force when power is supplied to it.

The gust locks described herein are electrically operated. In some embodiments, the gust locks do not continuously draw current from the aircraft batteries. The gust locks are also lightweight, relatively small, and provide relatively low-cost solutions. Moreover, although the gust locks are described herein as being implemented with a rotary actuator, the gust locks could also be implemented with a linear actuator.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A control surface actuator assembly, comprising:
an actuator housing;
an actuator drive source disposed within the actuator housing, the actuator drive source operable to rotate and supply an actuator drive torque;
a drive shaft rotationally mounted within, and extending from, the actuator housing, the drive shaft coupled to receive the drive torque from the actuator drive source to thereby position a control surface; and
a gust lock disposed within the actuator housing and movable between a locked position, in which rotation of the actuator drive source is prevented, and an unlocked position, in which rotation of the actuator drive source is not prevented, the gust lock comprising:
a lock shaft coupled to, and rotatable with, the drive source when the actuator drive source is rotating and the gust lock is in the unlocked position;
a lock rotor disposed on, and rotatable with, the lock shaft;
a lock motor configured, upon being electrically energized, to supply a lock drive torque;
a lock drive screw coupled to receive the lock drive torque and configured, upon receipt of the lock drive torque, to rotate;
a lock drive nut mounted on the lock drive screw and configured to translate, when the lock drive screw rotates, between an engage position, in which it engages the lock rotor and prevents the lock shaft and drive source from being rotated, and a disengage position, in which it does not engage the lock rotor and does not prevent the lock shaft and drive source from being rotated;
a detent mechanism disposed within the lock housing adjacent the lock drive nut, the detent mechanism urged into engagement with the lock drive nut;
one or more unlock depressions formed in an outer surface of the lock drive nut; and
one or more lock depressions spaced apart from the one or more unlock depressions and formed in the outer surface of the lock nut,
wherein:
the gust lock is in the locked position and the unlocked position when the lock drive nut is in the engage position and the disengage position, respectively,
the detent mechanism is disposed within the one or more unlock depressions when the lock drive nut is in the unlocked position, and
the detent mechanism is disposed within the one or more lock depressions when the lock drive nut is in the locked position.

2. The control surface actuator assembly of claim 1, further comprising:
a gearbox disposed within the actuator housing and coupled between the drive source and the output shaft, the gearbox configured to transfer the drive torque to the output shaft.

3. The control surface actuator assembly of claim 1, further comprising:

a gust lock position sensor disposed within the actuator housing, the gust lock position sensor disposed adjacent to, and configured to sense the position of, the gust lock.

4. The control surface actuator assembly of claim 1, further comprising:
a lock housing disposed within the actuator housing, the lock housing having at least the lock drive screw mounted therein and the lock drive nut at least partially disposed therein, wherein:
the lock drive screw is mounted in the lock housing in a manner that the lock drive screw is prevented from translating but is allowed to rotate;
the lock drive screw has drive screw threads formed on its outer surface;
the lock drive nut is mounted in the lock housing in a manner that the lock drive nut is prevented from rotating but is allowed to translate; and
the lock drive nut has drive nut threads formed on its inner surface that engage the drive screw threads.

5. The control surface actuator assembly of claim 1, wherein:
the lock rotor has a plurality of engagement cavities formed therein; and
when the lock drive nut is in the locked position, it is disposed in one of the engagement cavities.

6. A system for controlling an aircraft flight control surface, comprising:
a controller configured to control movement of the aircraft flight control surface; and
a flight control surface actuator in operable with the controller, the flight control surface actuator comprising:
an actuator housing;
an actuator drive source disposed within the actuator housing, the actuator drive source configured to be selectively energized from the controller and operable, upon being energized, to rotate and supply an actuator drive torque;
a drive shaft rotationally mounted within, and extending from, the actuator housing, the drive shaft coupled to receive the drive torque from the actuator drive source to thereby position a control surface;
a lock housing disposed within the actuator housing; and
a gust lock disposed within the actuator housing and configured, in response to commands from the controller, to move between a locked position, in which rotation of the actuator drive source is prevented, and an unlocked position, in which rotation of the actuator drive source is not prevented, the gust lock comprising:
a lock shaft coupled to, and rotatable with, the drive source when the drive source is rotating and the gust lock is in the unlocked position;
a lock rotor disposed on, and rotatable with, the lock shaft, the lock rotor having a plurality of engagement cavities formed therein;
a lock motor configured, upon being electrically energized, to supply a lock drive torque; and
a linear actuator mounted at least partially in the lock housing, the linear actuator coupled to receive the lock drive torque and configured, upon receipt of the lock drive torque, to move between an engaged position, in which it engages the lock rotor and prevents the lock shaft and drive source from being rotated, and a disengaged position, in which it does not engage the lock rotor and does not prevent the lock shaft and drive source from being rotated,
wherein the linear actuator comprises:
a lock drive screw having drive screw threads formed on its outer surface and mounted in the lock housing in a manner that the lock drive screw is prevented from translating but is allowed to rotate, the lock drive screw coupled to receive the lock drive torque and is configured, upon receipt of the lock drive torque, to rotate; and
a lock drive nut having drive nut threads formed on its inner surface that engage the drive screw threads and mounted in the lock housing in a manner that the lock drive nut is prevented from rotating but is allowed to translate, the lock drive nut mounted on the lock drive screw and configured to translate, when the lock drive screw rotates, between an engaged position, in which it is disposed in one of the engagement cavities and prevents the lock shaft and drive source from being rotated, and a disengaged position, in which it is not disposed in one of the engagement cavities and does not prevent the lock shaft and drive source from being rotated, and
wherein the gust lock is in the locked position and the unlocked position when the lock drive nut is in the engage position and the disengage position, respectively.

7. The system of claim 6, further comprising:
a gearbox disposed within the actuator housing and coupled between the drive source and the output shaft, the gearbox configured to transfer the drive torque to the output shaft; and
a gust lock position sensor disposed within the actuator housing, the gust lock position sensor disposed adjacent to, and configured to sense the position of, the gust lock and supply gust lock position sensor signals to the controller.

8. An actuator assembly, comprising:
an actuator drive source operable to rotate and supply an actuator drive torque to drive a component; and
a gust lock movable between a locked position, in which rotation of the actuator drive source is prevented, and an unlocked position, in which rotation of the actuator drive source is not prevented, the gust lock comprising:
a lock shaft coupled to, and rotatable with, the actuator drive source when the actuator drive source is rotating and the gust lock is in the unlocked position;
a lock rotor disposed on, and rotatable with, the lock shaft, the lock rotor having a plurality of engagement cavities formed therein;
a lock motor configured, upon being electrically energized, to supply a lock drive torque;
a lock drive screw coupled to receive the lock drive torque and configured, upon receipt of the lock drive torque, to rotate; and
a lock drive nut mounted on the lock drive screw and configured to translate, when the lock drive screw rotates, between an engage position, in which it is disposed in one of the engagement cavities and prevents the lock shaft and drive source from being rotated, and a disengage position, in which it is not disposed in one of the engagement cavities and does not prevent the lock shaft and drive source from being rotated, wherein the gust lock is in the locked position and the unlocked position when the lock drive nut is in the engage position and the disengage position, respectively.

9. The actuator assembly of claim 8, further comprising:
a gust lock position sensor disposed adjacent to, and configured to sense the position of, the gust lock.

10. The actuator assembly of claim 8, further comprising:
a lock housing having at least the lock drive screw mounted therein and the lock drive nut at least partially disposed therein.

11. The actuator assembly of claim 10, wherein:
the lock drive screw is mounted in the housing in a manner that the lock drive screw is prevented from translating but is allowed to rotate; and
the lock drive screw has drive screw threads formed on its outer surface.

12. The actuator assembly of claim 11, wherein:
the lock drive nut is mounted in the housing in a manner that the lock drive nut is prevented from rotating but is allowed to translate; and
the lock drive nut has drive nut threads formed on its inner surface that engage the drive screw threads.

13. The actuator assembly of claim 8, wherein the lock motor comprises a DC motor.

14. The actuator assembly of claim 8, further comprising:
a detent mechanism disposed adjacent the lock drive nut, the detent mechanism urged into engagement with the lock drive nut.

15. The actuator assembly of claim 14, further comprising:
one or more unlock depressions formed in an outer surface of the lock drive nut; and
one or more lock depressions spaced apart from the one or more unlock depressions and formed in the outer surface of the lock nut,
wherein:
the detent mechanism is disposed within the one or more unlock depressions when the lock drive nut is in the unlocked position, and
the detent mechanism is disposed within the one or more lock depressions when the lock drive nut is in the locked position.

\* \* \* \* \*